March 26, 1946.  B. O. AUSTIN  2,397,078
MOTOR CONTROL SYSTEM
Filed Nov. 10, 1943
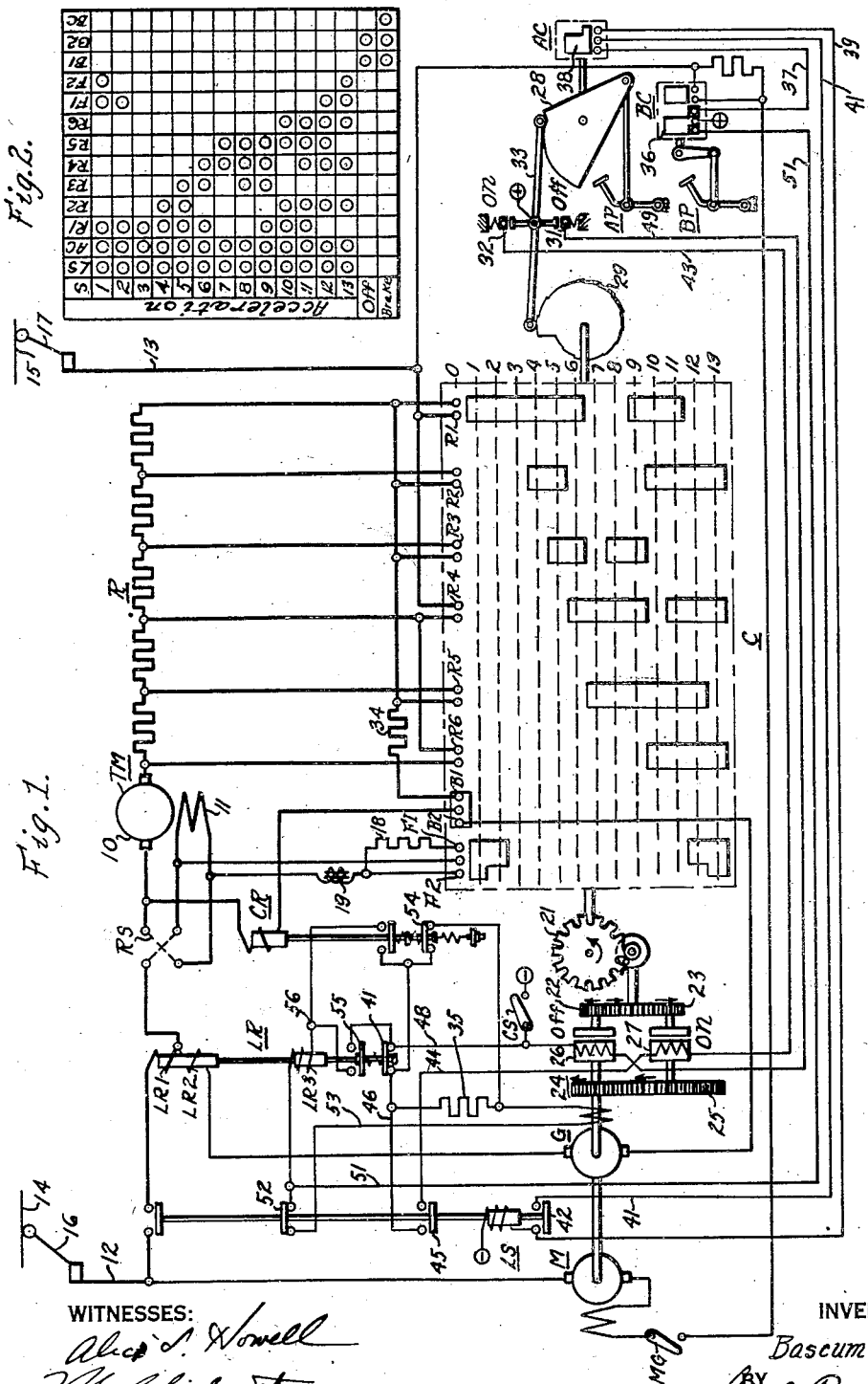
WITNESSES:
INVENTOR
Bascum O. Austin.
ATTORNEY Patented Mar. 26, 1946

2,397,078

UNITED STATES PATENT OFFICE 2,397,078

MOTOR CONTROL SYSTEM

Bascum O. Austin, Lima, Ohio, assignor to Westinghouse Electric Corporation, East Pittsburgh, Pa., a corporation of Pennsylvania Application November 10, 1943, Serial No. 509,704

15 Claims. (Cl. 172—179)

My invention relates, generally, to motor control systems and, more particularly, to systems for controlling the operation of the propelling motors of electric vehicles, such as trolley coaches and the like.

An object of my invention, generally stated, is to provide a control system for electrically propelled vehicles which shall be simple and efficient in operation and which may be economically manufactured and installed.

A more specific object of my invention is to provide for synchronizing a power-driven controller with an accelerating controller.

Another object of my invention is to provide a quick-responding dynamic braking system for an electrically propelled vehicle.

A further object of my invention is to maintain a substantially constant dynamic braking effort over a wide range of vehicle speed.

Still another object of my invention is to prevent overheating the separately excited field winding and the exciting source for the traction motor of a vehicle while the vehicle is standing still.

Other objects of my invention will be explained fully hereinafter or will be apparent to those skilled in the art.

In accordance with one embodiment of my invention, the field winding for the traction motor of a vehicle is excited during dynamic braking by a generator driven by an auxiliary motor which also drives a controller for controlling the motor current during acceleration of the traction motor. The controller is connected to the auxiliary motor by magnetic clutches, the operation of which is controlled by two cams. One cam is on the shaft of the controller and the other cam is driven by the accelerating pedal. When the accelerating cam is moved to any new position, either forward or backward, the controller cam shaft synchronizes to the position of the accelerating cam, thereby obtaining excellent speed control of the traction motor.

For a fuller understanding of the nature and objects of the invention, reference may be had to the following detailed description, taken in conjunction with the accompanying drawing, in which:

Figure 1 is a diagrammatic view of a control system embodying my invention; and

Fig. 2 is a chart showing the sequence of operation of part of the apparatus illustrated in Fig. 1.

Referring to the drawing, the system shown therein comprises a traction motor TM having an armature winding 10 and a series field winding 11; a reversing switch RS for controlling the direction of rotation of the motor TM; and a line switch LS for connecting the motor to power conductors 12 and 13 which are energized from trolley conductors 14 and 15 through current-collecting devices 16 and 17, respectively. A controller C is provided for shunting a resistor R from the motor circuit step-by-step to control the acceleration of the motor in a manner well known in the art.

The controller C is provided with a plurality of contact members R1, R2, R3, R4, R5 and R6 for shunting resistor R from the motor circuit. The controller is also provided with contact members F1 and F2 for shunting the field winding 11 through a resistor 18 and a reactor 19 during certain portions of the accelerating cycle, thereby controlling the torque and speed of the motor in a manner well known in the art. The controller C is also provided with contact members B1 and B2 for establishing a dynamic braking circuit for the motor TM.

In order to provide a quick response of the dynamic braking effect at all times and also to maintain smooth operation of the dynamic brake, an auxiliary generator G is provided for separately exciting the field winding 11 of the motor TM during dynamic braking. The generator G is driven by an auxiliary motor M which may be connected across the power conductors 12 and 13 by a switch MG. The motor M also drives the controller C through a Geneva gear 21 and directional gears 22 or 23 which are connected to gears 24 and 25, respectively, through electromagnetic clutches 26 and 27, respectively.

An accelerating pedal AP is provided for actuating a cam 28 and an accelerating controller AC. In order to synchronize the movement of the controller C with that of the accelerating pedal AP, a spiral cam 29 is provided on one end of the shaft for the controller C, and the operation of the electromagnetic clutches 26 and 27 is controlled by contact members 31 and 32, respectively, which, in turn, are actuated by a follower 33 for the cams 28 and 29. The cams 28 and 29 and the follower 33 are so constructed that when the accelerator cam 28 is moved to any new position, either forward or backward, by the accelerating pedal AP, the controller C is driven to a corresponding position as a result of the closing of the contact members 31 or 32 which, in turn, energize the proper electromagnetic clutch to cause the controller C to be driven in the proper direction by the auxiliary motor M. In this manner, the movement of the controller C is synchronized with that of the accelerating pedal AP and excellent speed control of the traction motor TM is obtained.

A current limit relay LR, which is responsive to the traction motor current, is provided for limiting the maximum rate of acceleration. The relay LR is provided with an actuating coil LR1 which is connected in the motor circuit during acceleration, a coil LR2 which is connected in the excitation circuit for the series field winding 11 of the motor TM during dynamic braking, and a coil LR3 which is energized at the end of the braking cycle, as will be explained more fully hereinafter.

During dynamic braking of the motor TM, the resistor R and an additional resistor 34 are connected in the circuit for the armature 10 of the motor TM, thereby permitting the braking energy to be dissipated through these resistors. The excitation current for the field winding 11 and the braking current add arithmetically through a common connection which includes the actuating coil of a regulating relay CR which is of the vibrating type. The vibrating contact members of the relay CR regulate the excitation current for the field winding of the auxiliary generator G, thereby holding the sum of the braking current and the excitation current for the field winding 11 constant above predetermined speeds. A resistor 35 is provided in the circuit for the field winding of the auxiliary generator G and is shunted by the vibrating contact members of the relay CR to produce the desired regulating effect in a manner well known in the art. A control switch CS is provided for connecting the control apparatus to a suitable source of control energy, such as an electric storage battery (not shown).

In order that the functioning of the foregoing apparatus may be more clearly understood, the operation of the system will now be described in more detail. Assuming that the switches CS and MG have been closed and that it is desired to accelerate the vehicle, the accelerating pedal AP is depressed, thereby actuating the controller drum AC and the controller cam 28. The contact members of the controller AC are closed, and the cam 28 closes the follow-on contact members 32.

The closing of the contact members of the controller AC establishes an energizing circuit for the actuating coil of the line switch LS which may be traced from positive at the controller BC through a contact segment 36, conductor 37, a contact segment 38 on the controller AC, conductor 39, and the actuating coil of the switch LS to negative. Upon closing of the switch LS, a holding circuit is established from the conductor 37 through the contact segment 38, conductor 41, and an interlock 42 on the switch LS.

Following the closing of the switch LS, the electromagnetic clutch 27 is energized to cause the controller C to be driven in an "on" direction by the auxiliary motor M. The energizing circuit for the electromagnetic clutch 27 extends from positive at the cam follower 33 through the contact members 32, conductor 43, the electromagnetic clutch 27, conductor 44, an interlock 45 on the switch LS, conductor 46, contact members 47 of the limit relay LR, conductor 48, and the switch CS to negative.

In this manner, the controller C is driven towards the "on" position, thereby closing the resistor shunting contact members R1 to R6 in the sequence indicated in the chart illustrated in Fig. 2. The operation of the controller C is under the control of the limit relay LR, the contact members 47 of which open when the motor current exceeds a predetermined amount, thereby deenergizing the electromagnetic clutch 27 and stopping further progression of the controller until the motor current decreases sufficiently to permit the contact members of the relay LR to close.

As explained hereinbefore, the positions of the controller C and the accelerating pedal AP are synchronized through the operation of the cams 28 and 29 and the follower 33. Thus, if the controller pedal AP is held at some intermediate position, the controller C is driven by the motor M to a position corresponding to that of the controller pedal AP, at which time the follow-on contact members 32 are opened and further progression of the controller C is stopped.

Should the controller pedal AP be returned towards its initial position, thereby causing the follow-off contact members 31 to be closed, the electromagnetic clutch 26 is energized to cause the controller C to be driven in the reverse direction by the motor M, thereby returning the controller toward its "off" position. The energizing circuit for the electromagnetic clutch 26 may be traced from positive at the follower 33 through contact member 31, conductor 49, the electromagnetic clutch 26, conductor 48, and the control switch CS to negative.

If it is desired to decelerate the vehicle by dynamic braking, the pedal AP is released and the pedal BP depressed. Releasing the pedal AP causes the controller C to be returned to the "off" position by the motor M in the manner hereinbefore described and also causes the switch LS to be opened to disconnect the traction motor from the power conductors. When the controller C is returned to the "off" position, the contact members B1 and B2 are closed to establish the dynamic braking circuit for the motor TM. As explained hereinbefore, the field winding 11 of the motor TM is energized by the generator G during dynamic braking. The excitation circuit for the field winding 11 is established through the contact members B2, and the braking circuit for the armature of the motor 10 is established by the contact members B1 through the resistors R and 34.

The operation of the pedal BP actuates the controller BC to establish an excitation circuit for the field winding of the auxiliary generator G. This circuit may be traced from positive at the controller BC through conductor 51, an interlock 52 on the switch LS, conductor 53, the field winding for the auxiliary generator G, the resistor 35, the contact members 47 of the limit relay LR, the conductor 48 and the control switch CS to negative.

As explained hereinbefore, the regulating relay CR functions to maintain a nearly constant braking effort over a wide range of vehicle speed by regulating the excitation current for the auxiliary generator G which, in turn, controls the excitation for the motor TM. The relay CR is provided with vibrating contact members 54 which shunt the resistor 35, thereby controlling the excitation current for the auxiliary generator G.

Since the actuating coil of the relay CR is responsive to the sum of the braking current and the excitation current for the field winding 11 of the traction motor, the excitation current is increased as the speed of the vehicle decreases. Thus, the current in the actuating coil LR2 of the limit relay LR which is connected in the excitation circuit for the field winding of the motor TM increases as the speed of the vehicle approaches zero. When the current in the coil LR2 reaches a predetermined amount, the contact members 47 of the limit relay LR are opened and contact members 55 are closed. The closing of the contact members 55 establishes an energizing circuit for the coil LR3 of the limit relay LR which extends from the conductor 51 through the coil LR3, conductor 56, the contact members 55, conductor 48, and the switch CS to negative. The limit relay LR is held in its uppermost position by the coil RL3, and the excitation circuit for the auxiliary generator G is deenergized upon opening of the contact members 47 of the limit relay. Thus, the excitation for both the auxiliary generator G and the motor TM is removed which prevents heating of the main motor field and of the motor generator set while the vehicle is not in operation.

From the foregoing description, it is apparent that I have provided a control system which simplifies the equipment and the operations necessary for the dynamic braking of a vehicle driven by a series motor. Furthermore, quick response of the dynamic braking effect is obtained and smooth operation is secured throughout the entire braking range. The system herein described also provides for excellent speed control of the motor during acceleration of the vehicle.

Since numerous changes may be made in the abovedescribed construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a motor control system, in combination, a motor for propelling a vehicle, a power-driven controller for controlling the operation of said motor, an accelerating controller, and cam follower means actuated jointly by said controllers for controlling the operation of said power-driven controller.

2. In a motor control system, in combination, a motor for propelling a vehicle, a power-driven controller for controlling the operation of said motor, cam means on said controller, an accelerating controller having cam means thereon, and switching means actuated jointly by the cam means on said controllers for controlling the operation of said power-driven controller.

3. In a motor control system, in combination, a motor for propelling a vehicle, a power-driven controller for controlling the operation of said motor, an accelerating controller, switching means for controlling the operation of the power-driven controller, and cam follower means actuated jointly by said controllers for controlling the operation of said switching means.

4. In a motor control system, in combination, a motor for propelling a vehicle, a power-driven controller for controlling the operation of said motor, an accelerating controller, switching means for controlling the operation of the power-driven controller, and cam and follower means mechanically interconnecting said controllers for actuating said switching means.

5. In a motor control system, in combination, a motor for propelling a vehicle, a power-driven controller for controlling the operation of said motor, an accelerating controller, cam follower means actuated jointly by said controllers for controlling the operation of said power-driven controller, and means responsive to the motor current for also controlling the operation of the power-driven controller.

6. In a motor control system, in combination, a motor for propelling a vehicle, a power-driven controller for controlling the operation of said motor, an accelerating controller, switching means for controlling the operation of the power-driven controller, and cam means actuated by each of said controllers for jointly controlling the operation of said switching means.

7. In a motor control system, in combination, a motor for propelling a vehicle, a power-driven controller for controlling the operation of said motor, an accelerating controller, switching means for controlling the operation of the power-driven controller, a cam driven by each of said controllers, and means jointly actuated by said cams for operating said switching means.

8. In a motor control system, in combination, a traction motor, a reversible controller for controlling the operation of said motor, an auxiliary motor for driving said controller, clutch means for connecting the auxiliary motor to said controller, and means responsive to the traction motor current for controlling the operation of said clutch means.

9. In a motor control system, in combination, a traction motor, a reversible controller for controlling the operation of said motor, an auxiliary motor for driving said controller, clutch means for connecting the auxiliary motor to said controller, an accelerating controller, and means actuated jointly by said controllers for controlling the operation of said clutch means.

10. In a motor control system, in combination, a traction motor, a reversible controller for controlling the operation of said motor, an auxiliary motor for driving said controller, clutch means for controlling the direction of operation of the reversible controller, an accelerating controller, and means actuated jointly by said controllers for controlling the operation of said clutch means.

11. In a motor control system, in combination, a motor for propelling a vehicle, said motor having an armature winding and a field winding, switching means for connecting said armature winding and said field winding in series-circuit relation during acceleration of the vehicle, additional switching means for establishing dynamic braking connections for the motor, a controller for controlling the motor armature current during acceleration of the motor, a generator for exciting the motor field winding during dynamic braking, and an auxiliary motor for driving said controller and said generator.

12. In a motor control system, in combination, a motor for propelling a vehicle, said motor having an armature winding and a field winding, switching means for connecting said armature winding and said field winding in series-circuit relation during acceleration of the vehicle, additional switching means for establishing dynamic braking connections for the motor, a controller for controlling the motor armature current during acceleration of the motor, a generator for exciting the motor field winding during dynamic braking, an auxiliary motor for driving said controller and said generator, clutch means for connecting the auxiliary motor to said controller, and relay means responsive to the motor current for controlling the operation of said clutch means.

13. In a motor control sytem, in combination, a motor for propelling a vehicle, said motor having an armature winding and a field winding, switching means for connecting said armature winding and said field winding in series circuit relation during acceleration of the vehicle, additional switching means for establishing dynamic braking connections for the motor, a controller for controlling the motor armature current during acceleration of the motor, a generator for exciting the motor field winding during dynamic braking, an auxiliary motor for driving said controller and said generator, and relay means responsive to the sum of the motor armature current and the motor field winding current for regulating the voltage of said generator.

14. In a motor control system, in combination, a motor for propelling a vehicle, said motor having an armature winding and a field winding, switching means for connecting said armature winding and said field winding in series-circuit relation during acceleration of the vehicle, additional switching means for establishing dynamic braking connections for the motor, a controller for controlling the motor armature current during acceleration of the motor, a generator for exciting the motor field winding during dynamic braking, an auxiliary motor for driving said controller and said generator, a separately excited field winding for said generator, and relay means responsive to the sum of the motor armature current and the motor field winding current for controlling the excitation current in said generator field winding.

15. In a motor control system, in combination, a motor for propelling a vehicle, said motor having an armature winding and a field winding, switching means for connecting said armature winding and said field winding in series-circuit relation during acceleration of the vehicle, additional switching means for establishing dynamic braking connections for the motor, a controller for controlling the motor armature current during acceleration of the motor, a generator for exciting the motor field winding during dynamic braking, an auxiliary motor for driving said controller and said generator, a separately excited field winding for said generator, and relay means responsive to the motor field winding current for deenergizing the generator field winding.

BASCUM O. AUSTIN.